United States Patent
Naumann et al.

(10) Patent No.: US 6,630,420 B1
(45) Date of Patent: *Oct. 7, 2003

(54) GLASS WITH HIGH PROPORTION OF ZIRCONIUM-OXIDE AND ITS USES

(75) Inventors: Karin Naumann, Ober-Olm (DE); Norbert Greulich-Hickmann, Mainz (DE); Uwe Kolberg, Mainz-Kastel (DE); Werner Kiefer, Mainz (DE); Simone Ritter, Mainz (DE)

(73) Assignee: Schott Glas, Mainz (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/913,424

(22) PCT Filed: Feb. 9, 2000

(86) PCT No.: PCT/EP00/01048

§ 371 (c)(1),
(2), (4) Date: Jan. 16, 2002

(87) PCT Pub. No.: WO00/48954

PCT Pub. Date: Aug. 24, 2000

(30) Foreign Application Priority Data

Feb. 15, 1999 (DE) .......................................... 199 06 241
Sep. 23, 1999 (DE) .......................................... 199 45 517

(51) Int. Cl.$^7$ .......................... C03C 3/087; C03C 13/02
(52) U.S. Cl. .............................. 501/70; 501/71; 501/38
(58) Field of Search ............................. 501/67, 68, 69, 501/70, 71, 38

(56) References Cited

U.S. PATENT DOCUMENTS 4,030,935 A  *  6/1977  Shults et al. .................. 501/64
4,065,317 A  * 12/1977  Baak et al. .................... 501/70

FOREIGN PATENT DOCUMENTS

| CZ | 236744 | 11/1986 |
|----|--------|---------|
| DE | 2 323 932 | 11/1973 |
| DE | 2 406 888 | 8/1974 |
| DE | 26 14 395 | 10/1976 |
| DE | 26 56 002 | 6/1978 |
| DE | 27 29 706 | 1/1979 |
| DE | 29 27 445 | 1/1980 |
| DE | 30 09 953 | 10/1980 |
| DE | 17 96 339 C3 | 12/1981 |
| DE | 31 07 600 A1 | 3/1982 |
| DE | 293105 A5 * | 10/1983 |
| DE | 293 105 A | 10/1983 |
| DE | 293105 A | 8/1991 |
| DE | 40 32 460 A1 | 6/1992 |
| EP | 0 446 064 B1 | 12/1991 |
| EP | 0 500 325 A1 | 8/1992 |
| EP | 0 853 070 A1 | 7/1998 |
| FR | 2 376 085 A | 7/1978 |
| GB | 965018 A | 7/1964 |
| GB | 1 290 528 | 9/1972 |
| GB | 2 220 654 A | 1/1990 |
| GB | 2 232 988 A | 1/1991 |
| JP | 62 13283 | 3/1987 |
| JP | 11043347 A | 2/1999 |
| SU | 594 066 A | 2/1978 |
| SU | 1413063 A1 * | 7/1988 |
| WO | 9840320 A | 9/1998 |

OTHER PUBLICATIONS

Derwent Abstract JP 55162444 A.

* cited by examiner

Primary Examiner—David Sample
Assistant Examiner—Elizabeth A Bolden
(74) Attorney, Agent, or Firm—Michael J. Striker

(57) ABSTRACT

The silicate glass has a composition (in % by weight, based on oxide) of $SiO_2$, 54–72; $Al_2O_3$, 0.5–7; $ZrO_2$, 10–20; $B_2O_3$, 0–<5; $Na_2O$, 3–<8; $K_2O$, 0–5; with $Na_2O+K_2O$, 2–<8; CaO, 3–11; MgO, 0–10; SrO, 0–8; BaO, 0∝10; with CaO+MgO+SrO+BaO, >5–24; $La_2O_3$, 0–5; and $TiO_2$, 0–4. The glass also contains at least 0.6 percent by weight of $La_2O_3$ or at least 0.1 percent by weight $TiO_2$. The glass has a hydrolytic resistance in hydrolytic glass 1, an acid resistance in acid class 3 or better, preferably acid class 1, a caustic lye resistance in lye class 1, a glass transition temperature ($T_g$) of at least 650° C., a thermal expansion coefficient ($\alpha_{20/300}$) of $4.1\times10^{-6}$ to $7.4\times10^{-6}$/K, a refractive index ($n_d$) of 1.53 to 1.63, an Abbé number ($v_d$) of 48 to 58 and a negative anomalous partial dispersion in a blue spectral region ($\Delta P_{g,F}$) of up to –0.0130.

14 Claims, No Drawings

GLASS WITH HIGH PROPORTION OF ZIRCONIUM-OXIDE AND ITS USES

BACKGROUND OF THE INVENTION

1. Field of the Invention

The invention relates to a glass having a high zirconium oxide content, and to uses thereof.

2. Description of the Related Art

Glasses having a high zirconium oxide content have mainly been described in connection with alkali-resistant glass fibers for concrete reinforcement. Compared with E-glass, a substantially alkali-free aluminoborosilicate glass, fibers made from known $ZrO_2$-containing glasses do have higher alkali resistance, but, in particular, their resistance in cement over a long period is inadequate. The alkali resistance of concrete-reinforcing fibers is of importance and is therefore usually to the fore during glass development, since the cement sets under highly alkaline conditions (pH values up to about 12.5). Besides the alkali resistance, however, the other chemical resistance, in particular the hydrolytic resistance, is clearly also of importance for long-term use as a reinforcing agent in concrete since it improves the long-term resistance.

Glasses which exhibit high resistance to water, acids and caustic lyes are interesting for a wide variety of applications, for example for pharmaceutical packaging or for inspection windows in process tanks, in particular if they additionally have high heat resistance.

A feature for high heat resistance is a high glass transition temperature $T_g$. In glasses having a high $T_g$, experience has shown that the so-called compaction (shrinkage) is low. This is shrinkage of glass parts during temperature treatment below the $T_g$, a property which can only be determined with sufficient accuracy with great experimental complexity and is of importance, for example, for applications in which very strict standards are set for the shape fidelity of the glass parts, for example for applications in display technology.

A high $T_g$ and thus high heat resistance of the glass is likewise important in thin-film photovoltaic technology, in particular in solar cells based on chalcopyrites, such as copper indium diselenide (CIS), but also alternative compound semiconductors, such as CdTe. In thin-film photovoltaic technology, higher coating temperatures are thus possible, enabling optimized application of thin films with improved material quality, which results in an increase in the efficiency, for example in a solar cell.

For optical applications, glasses having high negative anomalous partial dispersion in the blue spectral region ($\Delta P_{g,F}$) are extremely interesting for correction of image aberrations. A disadvantage of the glasses in this series that have been disclosed hitherto is that they either have large amounts of PbO, which is undesired from environmental points of view, and/or have poor chemical resistance or that large amounts of the very expensive raw materials $Nb_2O_5$ and in particular $Ta_2O_5$ have to be used for lead-free substitution products, which makes economical manufacture much more difficult. Lead-free glasses of this type are disclosed in DE-A 27 29 706.

A wide variety of specifications in the patent literature which describe alkali-resistant glasses having high $ZrO_2$ contents are also already known, but these still have disadvantages.

DE-A 29 27 445 describes an alkali-resistant glass composition which at least comprises 8% by weight of $R_2O$, namely 8–17% by weight of $Na_2O$ and 0–5% by weight of $K_2O$. CZ 236 744 also describes glass fibers made from mineral raw materials which comprise at least 8% by weight of $Na_2O$ and/or $K_2O$.

British Patent Specification GB 1,290,528 describes glass compositions for the production of glass fibers which comprise from 13 to 23 mol % of $R_2O$.

Glasses having such a high alkali metal content, as also occur in European Patent Specification EP 0 446 064 B1, which describes glass fiber materials for components of exhaust systems for internal-combustion engines (13–18% by weight of $Na_2O+K_2O$) and as also exhibited by the commercially available Cemfil fibers having a composition V1 (see below), exhibit poor hydrolytic resistance.

The same applies to the glass fibers in accordance with DE 17 96 339 C3 based on a glass comprising 11% by weight of $Na_2O$ and 1% by weight of $Li_2O$ and to the glasses converted into fibers in DE 40 32 460 A1, comprising 10–15% by weight of $Na_2O$ and 0.1–2% by weight of $K_2O$.

The Patent Specification DD 293 105 A5 describes a process for the production of highly alkali-resistant glass fibers and products produced therefrom, in which the glass melt to be spun, besides $SiO_2$, $R_2O_3$, $ZrO_2$, RO and $R_2O$ ($K_2O$, $Na_2O$ and/or $Li_2O$), also contains fluoride. This fluxing agent can only be omitted if $Li_2O$ is present. These glasses, with 8–14% by weight of $R_2O$, likewise have a relatively high alkali metal content.

The glass compositions from German Laid-Open Specification DE-A 2 406 888, which likewise have a high alkali metal content (10–25% by weight of $R_2O$), comprise up to 20% by weight of oxides of the rare earth metals, for example cerium oxide or also naturally occurring mixtures of these oxides.

Rare-earth metal oxides, to be precise together with $TiO_2$ in an amount of 0.5–16% by weight, where the $TiO_2$ content is at most 10% by weight of the glass, are also present in the glasses from German Laid-Open Specification DE 31 07 600 A1. They furthermore comprise 0.1–1% by weight of $Cr_2O_3$. An essential aspect here is that the chromium is substantially in the trivalent state.

German Laid-Open Specification DE-A 26 14 395 describes $Al_2O_3$-free glasses, which have to comprise 0.5–10% by weight of $Cr_2O_3+SnO_2$ for their alkali resistance, components which have the following disadvantages: $Cr_2O_3$ only dissolves in the glass flux with difficulty, and problems can also occur on use of chromium salts due to "chromium knots". $SnO_2$ is a good nucleating agent and therefore promotes crystallization. The glasses furthermore require 0.05–1% by weight of $SO_3$ as melt assistant, which can result in interfering foam and blow-hole formation.

DE-A 30 09 953 describes glass fibers which, besides $ZrO_2$, must contain $ThO_2$. This component is necessary in order to achieve alkali resistance. Owing to its radio activity, however, it is desirable to be able to omit this component.

EP 0 500 325 A1 discloses glass fibers containing 5–18 mol % of $TiO_2$. Their resultant chemical resistance is achieved at the expense of very high susceptibility to crystallization, which is particularly disadvantageous with respect to the spinnability of the glass melt.

JP 62/13293 B2 describes glass compositions containing at least 5% by weight of $B_2O_3$ for the core glass and coating of glass fibers. $ZrO_2$ is merely an optional component. Although these glasses have high water resistance, this cannot, however, be guaranteed over the entire composition range owing to the high $B_2O_3$ contents at the same time as relatively high alkali metal contents, since water-soluble alkali metal borate phases can easily form.

DE-A 2 323 932 describes glass fibers which contain both $P_2O_5$ and also $B_2O_3$ in addition to very high contents of $ZrO_2$ (8–16 mol %). The alkali metal content can vary within a broad range (1.5–25 mol %). Although such a high $ZrO_2$ content greatly increases the alkali resistance, $P_2O_5$ reduces it again however. In addition, the hydrolytic resistance cannot be adequate over the entire composition range.

GB 2 232 988 A describes $ZrO_2$-containing glass fibers which are coated with a thermoplastic resin in order to improve their alkali resistance. Owing to this additional process step, fibers of this type can only be produced expensively and in a complex manner. Fiber materials which can be used are glass fibers from the $SiO_2$—$ZrO_2$—$R_2O$ system with a fairly large variation latitude of the components and with further merely optional components, since, owing to the coating, the corresponding properties of the glass lose importance.

SUMMARY OF THE INVENTION

It is an object of the invention to provide a glass which has not only high caustic lye resistance, but also high hydrolytic resistance and relatively good acid resistance and which has high heat resistance and good processing properties.

This object is achieved by the glass having a high zirconium oxide content which is described in the main claim.

The glass according to the invention comprises from 54 to 72% by weight of $SiO_2$. At higher contents, the meltability would be impaired, while at lower contents, glass formation would be more difficult. At least 55% by weight are particularly preferred, at least 59% by weight are very particularly preferred.

$Al_2O_3$, present in amounts of from 0.5 to 7% by weight, preferably up to 6% by weight, in a similar manner to $SiO_2$ serves as glass former and thus improves the glass formation and makes a significant contribution toward improving the chemical resistance. However, excessively high contents would, in particular in the case of $ZrO_2$-rich and low-$R_2O$ compositions, result in an increased tendency toward crystallization.

An essential aspect for the high alkali resistance is the $ZrO_2$ content of the glass. It is therefore at least 8% by weight. The maximum content is 20% by weight, since otherwise the devitrification tendency increases excessively. The occurrence of crystals would result in glass flaws. A content of between 8 and 18% by weight is preferred. A content of at least 10% by weight is particularly preferred. A content of at most 15% by weight is particularly preferred.

The $ZrO_2/Al_2O_3$ weight ratio is preferably greater than 2.

The alkali metal oxide(s), especially $Na_2O$ (2–<8% by weight of $Na_2O$, preferably 3–<8% by weight, particularly preferably up to 4% by weight, and 0–5% by weight of $K_2O$, preferably 1–2% by weight, with 2–<8% by weight of $Na_2O+K_2O$, preferably 3–<8% by weight, particularly preferably 3–<6% by weight) serve(s) to improve the meltability, i.e the reduction in the viscosity, and enable the high $ZrO_2$ contents, since they increase the solubility of the $ZrO_2$ in the glass. However, if the alkali metal contents are too high, the hydrolytic resistance, in particular, but also, albeit to a lesser extent, the caustic lye resistance would be impaired. It is preferred for both $Na_2O$ and $K_2O$ to be present.

With increasing proportion of $Al_2O_3$, the $ZrO_2$ drops indirectly; this can be countered within the framework given by the stated limits by the presence of the alkali metal oxides. It is therefore preferred for the $Al_2O_3/Na_2O$ weight ratio to be <1.64, which corresponds to an $Al_2O_3/Na_2O$ molar ratio of <1. It is particularly preferred for not only the $Al_2O_3/Na_2O$ ratio, but also the $Al_2O_3/R_2O$ molar ratio to be <1.

$B_2O_3$ is an optional component and improves the meltability by reducing the viscosity. However, its content should remain restricted to less than 5% by weight, preferably to 4% by weight, since $B_2O_3$ impairs the alkali metal resistance and in particular the acid resistance.

Of the alkaline earth metal oxides, which are present in the glass to the extent of greater than 5% by weight and at most 24% by weight, CaO is present in an amount of 3–11% by weight, preferably 3–10% by weight, while MgO in an amount of 0–10% by weight, SrO in an amount of 0–8% by weight and BaO in an amount of 0–12% by weight are optional components.

The alkaline earth metal oxides reduce the melt viscosity, suppress crystallization and also contribute toward an improvement in the alkali resistance. BaO in particular reduces the tendency toward crystallization.

It is therefore preferred for BaO to be present in an amount of at least 0.1% by weight. If the alkaline earth metal oxide content were too low, the meltability and processing properties in these low-alkali glasses would be impaired excessively, and they could no longer be converted into fibers, and the $ZrO_2$ solubility would be too low. At a content greater than the maximum content mentioned, the glasses would devitrify, and crystallization would likewise occur. A total content of alkaline earth metal oxides of less than 23% by weight is preferred.

The glass may furthermore comprise 0–5% by weight of $La_2O_3$, preferably 0–4% by weight, and 0–4% by weight of $TiO_2$. Addition of $La_2O_3$ improves the meltability of the glass, broadens the glass formation range and increases the refractive index. $La_2O_3$ and $TiO_2$ principally contribute toward an improvement in the hydrolytic and caustic lye resistance, with $La_2O_3$ being more effective than $TiO_2$. Excessive contents of $La_2O_3$ and $TiO_2$ reduce the acid resistance and result in crystallization.

It is therefore preferred that the sum of $La_2O_3$, $TiO_2$ and $ZrO_2$ is >8.4. It is particularly preferred that the said sum is >10.

The glass may furthermore comprise up to 2% by weight, preferably up to 1% by weight, of each of $Fe_2O_3$, $MnO_2$ and $CeO_2$, where the sum of these three components should also not exceed 2% by weight, preferably should not exceed 1% by weight. These compounds are the usual impurities in naturally occurring raw materials of the glass constituents. In particular on use of the glasses according to the invention for the production of fibers for concrete reinforcement and as substrate in photovoltaic technology, inexpensive raw materials are of importance. On use of the glasses for optical purposes, the requirements of the purity of the glasses and thus of the purity of the raw materials are generally significantly greater. Here, the said sum and in particular the $Fe_2O_3$ content are preferably below 0.005% by weight.

For fining, the glasses may comprise conventional fining agents in conventional amounts, thus, for example, arsenic oxide, antimony oxide, chlorides or also fluorides, for example in each case as Ca or Ba halide, or, as preferred, $SnO_2$.

Within the composition range of the main claim, there are two preferred composition ranges (in % by weight, based on oxide).

These are firstly:

$SiO_2$ 54–72, $Al_2O_3$ 0.5–6, $ZrO_2$ 8–18, $B_2O_3$ 0–4, $Na_2O$ 3–<8, $K_2O$ 0–5, with $Na_2O+K_2O$ 3–<8, CaO 3–10, MgO 0–10, SrO 0–8, BaO 0.1–10, with CaO+MgO+SrO+BaO>5–<23, $La_2O_3$ 0–5, $TiO_2$ 0–4.

The glasses of this composition range have high heat resistance. They have transition temperatures of at least 670° C.

A further preferred composition range is the following:

$SiO_2$ 59–72, $Al_2O_3$ 0.5–6, $ZrO_2$ 8–15, $B_2O_3$ 0–4, $Na_2O$ 2–4, $K_2O$ 1–2, with $Na_2O+K_2O$ 3–<6, CaO 3–10, MgO 0–10, SrO 0–8, BaO 0.1–10, with CaO+MgO+SrO+BaO>5–<23, $La_2O_3$ 0–5, $TiO_2$ 0–4.

This composition range includes glasses having coefficients of thermal expansion $\alpha_{20/300}$ of from 4.5 to $6.0 \cdot 10^{-6}/K$.

EXAMPLES

Sixteen examples of glasses according to the invention were melted from conventional raw materials in Pt/Rh crucibles and cast to give blocks. In addition, fibers were drawn by the re-drawing method.

Table 1 shows the composition (in % by weight, based on oxide) of the working examples (A1–A16) and of an alkali-rich comparative example V1. The missing amount to the respective total content of 100.0% in A1–A15 is the fining agent $SnO_2$, which is not indicated in Table 1. A16 was fined with added NaCl, which is found in an amount of ·0.1% by weight in the finished glass. Table 2 shows the main properties of the glasses. These are the coefficient of thermal expansion $\alpha_{20/300}$ [$10^{-6}/K$], the glass transition temperature $T_g$ [° C.], the working point $V_A$ [° C.], the density ·[g/cm³], the modulus of elasticity E [GPa], the temperature at which the glass has an electrical volume resistivity of $10^8$ [lacuna] cm, $T_{K100}$ [° C.], and the hydrolytic resistance H in accordance with DIN/ISO 719 [μg of $Na_2O/g$], the acid resistance S in accordance with DIN 12116 [mg/dm²] and the lye resistance L in accordance with ISO 675 (=DIN 52322) [mg/dm²]. For some examples the optical data refractive index $n_d$, Abbe number $\nu_d$ and anomalous partial dispersion in the blue region of the spectrum $\Delta P_{g,F}$ are also shown.

TABLE 1

Working examples (A) and comparative examples (V1)
Compositions (in % by weight, based on oxide)

|  | A1 | A2 | A3 | A4 | A5 | A6 | A7 | A8 |
|---|---|---|---|---|---|---|---|---|
| $SiO_2$ | 69.5 | 70.0 | 54.8 | 56.8 | 54.9 | 64.8 | 60.0 | 57.5 |
| $Al_2O_3$ | 1.0 | 1.0 | 1.0 | 6.0 | 1.0 | 2.0 | 1.0 | 1.0 |
| $ZrO_2$ | 17.0 | 17.0 | 17.9 | 18.0 | 17.9 | 17.0 | 17.9 | 17.3 |
| $B_2O_3$ | — | — | — | — | — | — | — | 3.8 |
| BaO | — | 3.0 | 10.0 | 8.2 | 0.3 | 8.0 | 4.0 | 3.8 |
| CaO | 5.0 | 5.0 | 4.3 | 3.0 | 4.0 | 3.0 | 8.1 | 7.7 |
| MgO | — | — | — | — | 10.0 | — | 1.0 | 1.0 |
| SrO | — | — | — | — | — | — | — | — |
| $Na_2O$ | 7.2 | 3.7 | 7.8 | 2.8 | 7.7 | 2.0 | 7.8 | 7.7 |
| $K_2O$ | — | — | — | 5.0 | — | 3.0 | — | — |
| $La_2O_3$ | — | — | — | — | — | — | — | — |
| $TiO_2$ | — | — | 4.0 | — | 4.0 | — | — | — |

|  | A9 | A10 | A11 | A12 | A13 | A14 | A15 | A16 | V1 |
|---|---|---|---|---|---|---|---|---|---|
| $SiO_2$ | 64.7 | 55.6 | 69.9 | 54.8 | 69.9 | 67.6 | 65.5 | 67.0 | 62.0 |
| $Al_2O_3$ | 2.0 | 1.0 | 1.0 | 1.0 | 1.0 | 0.5 | 5.0 | 2.0 | 0.8 |
| $ZrO_2$ | 17.0 | 15.1 | 10.0 | 10.0 | 11.9 | 17.0 | 17.0 | 8.5 | 16.7 |
| $B_2O_3$ | — | — | — | — | — | — | — | 3.5 | — |
| BaO | — | 9.3 | 1.2 | 4.0 | — | — | — | 5.0 | — |
| CaO | 3.0 | 7.7 | 8.0 | 8.0 | 4.0 | 5.0 | 5.0 | 8.4 | 5.6 |
| MgO | — | — | — | 10.0 | 10.0 | 2.5 | — | 1.6 | — |
| SrO | 8.0 | — | 5.1 | — | — | — | — | — | — |
| $Na_2O$ | 2.0 | 6.8 | 3.5 | 3.0 | 3.0 | 7.2 | 7.2 | 2.0 | 14.8 |
| $K_2O$ | 3.0 | 1.0 | 0.5 | — | — | — | — | 2.0 | — |
| $La_2O_3$ | — | 3.2 | 0.6 | 5.0 | — | — | — | — | — |
| $TiO_2$ | — | 0.1 | — | 4.0 | — | — | — | — | 0.1 |

TABLE 2

Properties of the glasses A (working examples) and V1 (comparative example)
(compositions see Table 1)

|  | A1 | A2 | A3 | A4 |
|---|---|---|---|---|
| $\alpha_{20/300}$ [$10^{-6}/K$] | 5.10 | 4.13 | 6.30 | 5.90 |
| Tg [° C.] | 747 | 802 | 730 | 810 |
| $V_A$ [° C.] | 1326 | 1405 | 1203 | 1341 |
| · [g/cm³] | 2.664 | 2.687 | 2.937 | 2.849 |
| E [GPa] | 84 | 86 | 88 | 84 |
| $T_{K100}$ [° C.] | n.m. | n.m. | 205 | 279 |
| H [μg $Na_2O$/g] | 14 | 7 | 17 | 8 |
| S [mg/dm²] | 0.4 | 0.5 | 1.3 | 1.4 |
| L [mg/dm²] | 10 | 13 | 9 | 12 |
| $n_d$ | 1.55395 | 1.55792 | 1.6012 | 1.57249 |
| $\nu_d$ | 54.27 | 54.25 | n.m. | 53.48 |
| $\Delta P_{g,F}$ | −0.0117 | −0.0075 | n.m. | −0.0059 |

|  | A5 | A6 | A7 | A8 |
|---|---|---|---|---|
| $\alpha_{20/300}$ [$10^{-6}/K$] | 6.51 | 4.60 | 6.43 | 6.29 |
| Tg [° C.] | 695 | 821 | 725 | 672 |
| $V_A$ [° C.] | 1026 | 1390 | 1194 | 1151 |
| · [g/cm³] | 2.873 | 2.787 | 2.863 | 2.836 |
| E [GPa] | 95 | 85 | 90 | 89 |
| $T_{K100}$ [° C.] | 238 | 300 | 213 | 371 |
| H [μg $Na_2O$/g] | 10 | 8 | 19 | 16 |
| S [mg/dm²] | 1.3 | 0.4 | 0.9 | 1.8 |

TABLE 2-continued

| L [mg/dm²] | 19 | 11 | 8 | 9 |
|---|---|---|---|---|
| $n_d$ | n.m. | 1.56136 | 1.5860 | 1.58415 |
| $\nu_d$ | n.m. | 55.28 | n.m. | 53.19 |
| $\Delta P_{g,F}$ | n.m. | n.m. | n.m. | −0.0070 |

| | A9 | A10 | A11 | A12 | A13 |
|---|---|---|---|---|---|
| $\alpha_{20/300}$ [$10^{-6}$/K] | 4.82 | 7.11 | 5.17 | 6.18 | 4.49 |
| Tg [° C.] | 822 | 700 | 731 | 715 | 741 |
| $V_A$ [° C.] | 1371 | 1163 | 1285 | 1092 | 1325 |
| ρ [g/cm³] | 2.788 | 2.984 | 2.702 | 2.968 | 2.633 |
| E [GPa] | 85 | 88 | 82 | 96 | 88 |
| $T_{K100}$ [° C.] | 303 | 235 | 260 | 436 | 336 |
| H [μg Na₂O/g] | 6 | 9 | 12 | 26 | 17 |
| S [mg/dm²] | 0.9 | 1.2 | <0.3 | 2.7 | 1.3 |
| L [mg/dm²] | 8 | 7 | 18 | 13 | 18 |
| $n_d$ | 1.5644 | n.m. | 1.54758 | 1.617 | 1.54953 |
| $\nu_d$ | n.m. | n.m. | 57.00 | 49.07 | 65.51 |
| $\Delta P_{g,F}$ | n.m. | n.m. | −0.0050 | −0.003 | n.m. |

| | A14 | A15 | A16 | V1 |
|---|---|---|---|---|
| $\alpha_{20/300}$ [$10^{-6}$/K] | 5.30 | 5.36 | 5.27 | 7.50 |
| Tg [° C.] | 738 | 784 | 650 | 546 |
| $V_A$ [° C.] | n.m. | n.m. | 1239 | 1183 |
| ρ [g/cm³] | n.m. | n.m. | 2.633 | 2.700 |
| E [GPa] | n.m. | 83 | n.m. | 83 |
| $T_{K100}$ [° C.] | n.m. | n.m. | 294 | n.m. |
| H [μg Na₂O/g] | 16 | 16 | 16 | 77 |
| S [mg/dm²] | 0.6 | 0.9 | 1.1 | 0.9 |
| L [mg/dm²] | 9 | 13 | 24 | 10 |
| $n_d$ | 1.56065 | n.m. | n.m. | n.m. |
| $\nu_d$ | 54.25 | n.m. | n.m. | n.m. |
| $\Delta P_{g,F}$ | −0.0071 | n.m. | n.m. | n.m. | n.m. = not measured

For glass A2, the Knoop hardness in accordance with DIN 52333 was also determined. It is 630 HK.

The glasses according to the invention have very good chemical resistances:

On determination of the hydrolytic resistance H in accordance with DIN/ISO 719, in which the base equivalent of the acid consumption is given as μg of Na₂O/g of glass grit, a value of 31 means that a glass belongs to hydrolytic class 1 ("highly chemically resistant glass"). This is satisfied for the glasses according to the invention.

On determination of the acid resistance S in accordance with DIN 12116, a weight loss of up to 0.7 mg/dm² means that the glass belongs to acid class 1 ("acid resistant"), from more than 0.7 to 1.5 mg/dm² means that the glass belongs to acid class 2 ("weakly acid soluble") and from >1.5 to 15 mg/dm² means that the glass belongs to acid class 3 ("moderately acid soluble"). The glasses according to the invention belong to acid class 3 or better.

On determination of the caustic lye resistance in accordance with ISO 675 (=DIN 52322), a weight loss of up to 75 mg/dm² means that the glass belongs to lye class 1 ("weakly lye-soluble"), which is satisfied for the glasses according to the invention.

The glasses are very highly suitable as container glass, especially for chemically aggressive substances, in particular liquids.

Comparative example V1 satisfies neither the requirements for high hydrolytic resistance, nor for a high transition temperature. By contrast, the glasses according to the invention have high transition temperatures $T_g$ of at least 650° C., in most cases even of at least 670° C. They are thus suitable for uses in which highly thermally resistant glasses are required, for example also as components of parts in exhaust systems with catalytic converters which are subjected to high temperatures. Owing to their low compaction, which is associated with a high transition temperature, the glasses are also highly suitable for use as substrate glasses in display technology.

The glasses according to the invention have coefficients of thermal expansion $\alpha_{20/300}$ of from $4.1 \times 10^{-6}$/K to $7.4 \times 10^{-6}$/K and are thus fusible to tungsten and molybdenum and are highly suitable as fusing glass for these metals.

Glasses having coefficients of thermal expansion $\alpha_{20/300}$ of from $4.5 * 10^{-6}$/K to $5.2 * 10^{-6}$/K are matched to the expansion behavior of the Mo film applied as electrode in CIS technology, while glasses having coefficients of thermal expansion ·20/300 of from 5.0 to $6.0 * 10^{-6}$/K are matched to the expansion behavior of CdTe. These highly heat-resistant glasses are thus extremely suitable as substrates in photovoltaics, especially in these thin-film technologies.

The glasses according to the invention can be chemically tempered by ion exchange, as a result of which they are also highly suitable for applications in which increased shatter resistance is important, for example as substrates for EDP storage media.

The glasses according to the invention can readily be converted into glass fibers. Owing to the good chemical resistance of the glasses, which results in increased long-term durability, these glass fibers are extremely suitable for the reinforcement of concrete parts. Both use as short fibers and as continuous fibers (production of concrete/glass fiber composites) is possible.

The glasses have good processing properties for the production of, for example, blocks, sheets, rods, tubes and fibers; and they can also be employed in these forms, depending on the application.

The optical data of the glasses, namely a refractive index $n_d$ of from 1.53 to 1.63, and Abbe number $\nu_d$ of from 47 to 66 and in particular a negative deviation of the partial dispersion from the perpendicular (=negative anomalous partial dispersion) in the blue spectral region $\Delta P_{g,F}$ of up to −0.0130 also makes them interesting for optical applications, for example for glasses for the correction of chromatic aberrations.

The glasses are so-called short flint glasses. It is surprising that, besides the good properties described with respect to thermal, mechanical and chemical parameters, the glasses also have very interesting optical properties, in particular a negative anomalous partial dispersion in the blue spectral region ($\Delta P_{g,F}$) It has hitherto only been known here that this property is caused in combination with relatively low Abbe numbers (glasses of the flint type $\nu_d$ <about 55) by PbO, $Nb_2O_5$ and $Ta_2O_5$. In glasses having a high Abbe number (crown type $\nu_d$ >about 55), this property can also be caused by the alkaline earth metal oxides MgO—BaO and rare-earth elements $La_2O_3$, $Gd_2O_3$, $Yb_2O_3$, $Lu_2O_3$, etc., often in combination with the glass former $B_2O_3$.

For the first time, glasses having a negative $\Delta P_{g,F}$ with low to moderate Abbe numbers which have relatively low concentrations of alkaline earth metal oxides, $B_2O_3$ and, if desired, $La_2O_3$ as rare-earth metal oxide and are free from the expensive components $Nb_2O_5$ and $Ta_2O_5$ are now available here.

What is claimed is:

1. A glass having a high zirconium oxide content and a composition consisting of, in percent by weight based on oxide content:

| | |
|---|---|
| $SiO_2$ | 54 to 72 |
| $Al_2O_3$ | 0.5 to 7 |
| $ZrO_2$ | 10 to 20 |
| $B_2O_3$ | 0 to <5 |
| CaO | 3 to 11 |
| MgO | 0 to 10 |
| SrO | 0 to 8 |
| BaO | 0 to 10 |
| CaO + MgO + SrO + BaO | >5 to 24 |
| $Na_2O$ | 2 to <8 |
| $K_2O$ | 0 to 5 |
| $Na_2O + K_2O$ | 2 to <8 |
| $La_2O_3$ | 0 to 5 |
| $TiO_2$ | 0 to 4 | and optionally at least one fining agent in an amount sufficient for fining;
wherein either said $TiO_2$ is present in amounts greater than 0.1 percent by weight or said $La_2O_3$ is present in amounts greater than 0.6 percent by weight.

2. The glass as defined in claim 1, and having a hydrolytic resistance in hydrolytic class 1, an acid resistance in acid class 3 or better, a caustic lye resistance in lye class 1, a glass transition temperature ($T_g$) of at least 650° C., a coefficient of thermal expansion ($\alpha_{20/300}$) of $4.1\times10^{-6}$ to $7.4\times10^{-6}$/K, a refractive index ($n_d$) of 1.53 to 1.63, an Abbé number ($\nu_d$) of 48 to 58 and a negative anomalous partial dispersion in a blue spectral region ($\Delta P_{g,F}$) of up to −0.0130.

3. The glass as defined in claim 1, wherein a weight ratio of $ZrO_2/Al_2O_3$ is greater than 2.

4. A glass having a high zirconium oxide content and a composition consisting of, in percent by weight based on oxide content:

| | |
|---|---|
| $SiO_2$ | 54 to 72 |
| $Al_2O_3$ | 0.5 to 6 |
| $ZrO_2$ | 10 to 18 |
| $B_2O_3$ | 0 to 4 |
| CaO | 3 to 10 |
| MgO | 0 to 10 |
| SrO | 0 to 8 |
| BaO | 0.1 to 10 |
| CaO + MgO + SrO + BaO | >5 to <23 |
| $Na_2O$ | 3 to <8 |
| $K_2O$ | 0 to 5 |
| $Na_2O + K_2O$ | 3 to <8 |
| $La_2O_3$ | 0 to 5 |
| $TiO_2$ | 0 to 4 | and optionally at least one fining agent in an amount sufficient for fining;
wherein either said $TiO_2$ is present in amounts greater than 0.1 percent by weight or said $La_2O_3$ is present in amounts greater than 0.6 percent by weight.

5. The glass as defined in claim 4, and having a hydrolytic resistance in hydrolytic class 1, an acid resistance in acid class 3 or better, a caustic lye resistance in lye class 1, a glass transition temperature ($T_g$) of at least 650° C., a coefficient of thermal expansion ($\alpha_{20/300}$) of $4.1\times10^{-6}$ to $7.4\times10^{-6}$/K, a refractive index ($n_d$) of 1.53 to 1.63, an Abbé number ($\nu_d$) of 48 to 58 and a negative anomalous partial dispersion in a blue spectral region ($\Delta P_{g,F}$) of up to −0.0130.

6. The glass as defined in claim 4, wherein a weight ratio of $ZrO_2/Al_2O_3$ is greater than 2.

7. A glass having a high zirconium oxide content and a composition consisting of, in percent by weight based on oxide content:

| | |
|---|---|
| $SiO_2$ | 59 to 72 |
| $Al_2O_3$ | 0.5 to 6 |
| $ZrO_2$ | 10 to 15 |
| $B_2O_3$ | 0 to 4 |
| CaO | 3 to 10 |
| MgO | 0 to 10 |
| SrO | 0 to 8 |
| BaO | 0.1 to 10 |
| CaO + MgO + SrO + BaO | >5 to <23 |
| $Na_2O$ | 2 to 4 |
| $K_2O$ | 1 to 2 |
| $Na_2O + K_2O$ | 3 to <6 |
| $La_2O_3$ | 0 to 5 |
| $TiO_2$ | 0 to 4 | and optionally at least one fining agent in an amount sufficient for fining;
wherein either said $TiO_2$ is present in amounts greater than 0.1 percent by weight or said $La_2O_3$ is present in amounts greater than 0.6 percent by weight.

8. The silicate glass as defined in claim 7, and having a hydrolytic resistance in hydrolytic class 1, an acid resistance in acid class 3 or better, a caustic lye resistance in lye class 1, a glass transition temperature ($T_g$) of at least 650° C., a coefficient of thermal expansion ($\alpha_{20/300}$) of $4.1\times10^{-6}$ to $7.4\times10^{-6}$/K, a refractive index ($n_d$) of 1.53 to 1.63, an Abbé number ($\nu_d$) of 48 to 58 and a negative anomalous partial dispersion in a blue spectral region ($\Delta P_{g,F}$) of up to −0.0130.

9. The glass as defined in claim 7, wherein a weight ratio of $ZrO_2/Al_2O_3$ is greater than 2.

10. A glass fiber consisting of a glass having a high zirconium oxide content and a composition consisting of, in percent by weight based on oxide content:

| | |
|---|---|
| $SiO_2$ | 54 to 72 |
| $Al_2O_3$ | 0.5 to 7 |
| $ZrO_2$ | 10 to 20 |
| $B_2O_3$ | 0 to <5 |
| CaO | 3 to 11 |
| MgO | 0 to 10 |
| SrO | 0 to 8 |
| BaO | 0 to 10 |
| CaO + MgO + SrO + BaO | >5 to 24 |
| $Na_2O$ | 2 to <8 |
| $K_2O$ | 0 to 5 |
| $Na_2O + K_2O$ | 2 to <8 |
| $La_2O_3$ | 0 to 5 |
| $TiO_2$ | 0 to 4 | and optionally at least one fining agent in an amount sufficient for fining;

wherein either said $TiO_2$ is present in amounts greater than 0.1 percent by weight or said $La_2O_3$ is present in amounts greater than 0.6 percent by weight; and wherein said glass has a hydrolytic resistance in hydrolytic class 1, an acid resistance in acid class 3 or better, a caustic lye resistance in lye class 1, a glass transition temperature ($T_g$) of at least 650° C., a coefficient of thermal expansion ($\alpha_{20/300}$) of $4.1 \times 10^{-6}$ to $7.4 \times 10^{-6}$/K, a refractive index ($n_d$) of 1.53 to 1.63, an Abbé number ($v_d$) of 48 to 58 and a negative anomalous partial dispersion in a blue spectral region ($\Delta P_{g,F}$) of up to −0.0130.

11. A substrate glass for display technology or photovoltaics, said substrate glass having a high zirconium oxide content and a composition consisting of, in percent by weight based on oxide content:

| | |
|---|---|
| $SiO_2$ | 54 to 72 |
| $Al_2O_3$ | 0.5 to 7 |
| $ZrO_2$ | 10 to 20 |
| $B_2O_3$ | 0 to <5 |
| CaO | 3 to 11 |
| MgO | 0 to 10 |
| SrO | 0 to 8 |
| BaO | 0 to 10 |
| CaO + MgO + SrO + BaO | >5 to 24 |
| $Na_2O$ | 2 to <8 |
| $K_2O$ | 0 to 5 |
| $Na_2O + K_2O$ | 2 to <8 |
| $La_2O_3$ | 0 to 5 |
| $TiO_2$ | 0 to 4 | and optionally at least one fining agent in an amount sufficient for fining;

wherein either said $TiO_2$ is present in amounts greater than 0.1 percent by weight or said $La_2O_3$ is present in amounts greater than 0.6 percent by weight; and wherein said glass has a hydrolytic resistance in hydrolytic class 1, an acid resistance in acid class 3 or better, a caustic lye resistance in lye class 1, a glass transition temperature ($T_g$) of at least 650° C., a coefficient of thermal expansion ($\alpha_{20/300}$) of $4.1 \times 10^{-6}$ to $7.4 \times 10^{-6}$/K, a refractive index ($n_d$) of 1.53 to 1.63, an Abbé number ($v_d$) of 48 to 58 and a negative anomalous partial dispersion in a blue spectral region ($\Delta P_{g,F}$) of up to −0.0130.

12. An optical glass having a high zirconium oxide content and a composition consisting of, in percent by weight based on oxide content:

| | |
|---|---|
| $SiO_2$ | 54 to 72 |
| $Al_2O_3$ | 0.5 to 7 |
| $ZrO_2$ | 10 to 20 |
| $B_2O_3$ | 0 to <5 |
| CaO | 3 to 11 |
| MgO | 0 to 10 |
| SrO | 0 to 8 |
| BaO | 0 to 10 |
| CaO + MgO + SrO + BaO | >5 to 24 |
| $Na_2O$ | 2 to <8 |
| $K_2O$ | 0 to 5 |
| $Na_2O + K_2O$ | 2 to <8 |
| $La_2O_3$ | 0 to 5 |
| $TiO_2$ | 0 to 4 | and optionally at least one fining agent in an amount sufficient for fining;

wherein either said $TiO_2$ is present in amounts greater than 0.1 percent by weight or said $La_2O_3$ is present in amounts greater than 0.6 percent by weight; and wherein said glass has a hydrolytic resistance in hydrolytic class 1, an acid resistance in acid class 3 or better, a caustic lye resistance in lye class 1, a glass transition temperature ($T_g$) of at least 650° C., a coefficient of thermal expansion ($\alpha_{20/300}$) of $4.1 \times 10^{-6}$ to $7.4 \times 10^{-6}$/K, a refractive index ($n_d$) of 1.53 to 1.63, an Abbé number ($v_d$) of 48 to 58 and a negative anomalous partial dispersion in a blue spectral region ($\Delta P_{g,F}$) of up to −0.0130.

13. A container glass for chemically reactive liquids, said container glass having a high zirconium oxide content and a composition consisting of, in percent by weight based on oxide content:

| | |
|---|---|
| $SiO_2$ | 54 to 72 |
| $Al_2O_3$ | 0.5 to 7 |
| $ZrO_2$ | 10 to 20 |
| $B_2O_3$ | 0 to <5 |
| CaO | 3 to 11 |
| MgO | 0 to 10 |
| SrO | 0 to 8 |
| BaO | 0 to 10 |
| CaO + MgO + SrO + BaO | >5 to 24 |
| $Na_2O$ | 2 to <8 |
| $K_2O$ | 0 to 5 |
| $Na_2O + K_2O$ | 2 to <8 |
| $La_2O_3$ | 0 to 5 |
| $TiO_2$ | 0 to 4 | and optionally at least one fining agent in an amount sufficient for fining;

wherein either said $TiO_2$ is present in amounts greater than 0.1 percent by weight or said $La_2O_3$ is present in amounts greater than 0.6 percent by weight; and wherein said glass has a hydrolytic resistance in hydrolytic class 1, an acid resistance in acid class 3 or better, a caustic lye resistance in lye class 1, a glass transition temperature ($T_g$) of at least 650° C., a coefficient of thermal expansion ($\alpha_{20/300}$) of $4.1 \times 10^{-6}$ to $7.4 \times 10^{-6}$/K, a refractive index ($n_d$) of 1.53 to 1.63, an Abbé number ($v_d$) of 48 to 58 and a negative anomalous partial dispersion in a blue spectral region ($\Delta P_{g,F}$) of up to −0.0130.

14. A composite glass-metal article made by fusing a piece of tungsten or molybdenum to a glass, wherein said glass having a high zirconium oxide content and a composition consisting of, in percent by weight based on oxide content:

| | |
|---|---|
| $SiO_2$ | 54 to 72 |
| $Al_2O_3$ | 0.5 to 7 |
| $ZrO_2$ | 10 to 20 |
| $B_2O_3$ | 0 to <5 |
| CaO | 3 to 11 |
| MgO | 0 to 10 |
| SrO | 0 to 8 |
| BaO | 0 to 10 |
| CaO + MgO + SrO + BaO | >5 to 24 |
| $Na_2O$ | 2 to <8 |
| $K_2O$ | 0 to 5 |
| $Na_2O + K_2O$ | 2 to <8 |
| $La_2O_3$ | 0 to 5 |
| $TiO_2$ | 0 to 4 | and optionally at least one fining agent in an amount sufficient for fining;

wherein either said $TiO_2$ is present in amounts greater than 0.1 percent by weight or said $La_2O_3$ is present in amounts greater than 0.6 percent by weight; and wherein said glass has a hydrolytic resistance in hydrolytic class 1, an acid resistance in acid class 3 or better, a caustic lye resistance in lye class 1, a glass transition temperature ($T_g$) of at least 650° C., a coefficient of thermal expansion ($\alpha_{20/300}$) of $4.1 \times 10^{-6}$ to $7.4 \times 10^{-6}$/K, a refractive index ($n_d$) of 1.53 to 1.63, an Abbé number ($v_d$) of 48 to 58 and a negative anomalous partial dispersion in a blue spectral region ($\Delta P_{g,F}$) of up to −0.0130.

* * * * *